S. B. BOWMAN.
MEANS FOR DISTRIBUTING MOLTEN GLASS.
APPLICATION FILED MAR. 27, 1915.
1,191,868.
Patented July 18, 1916.
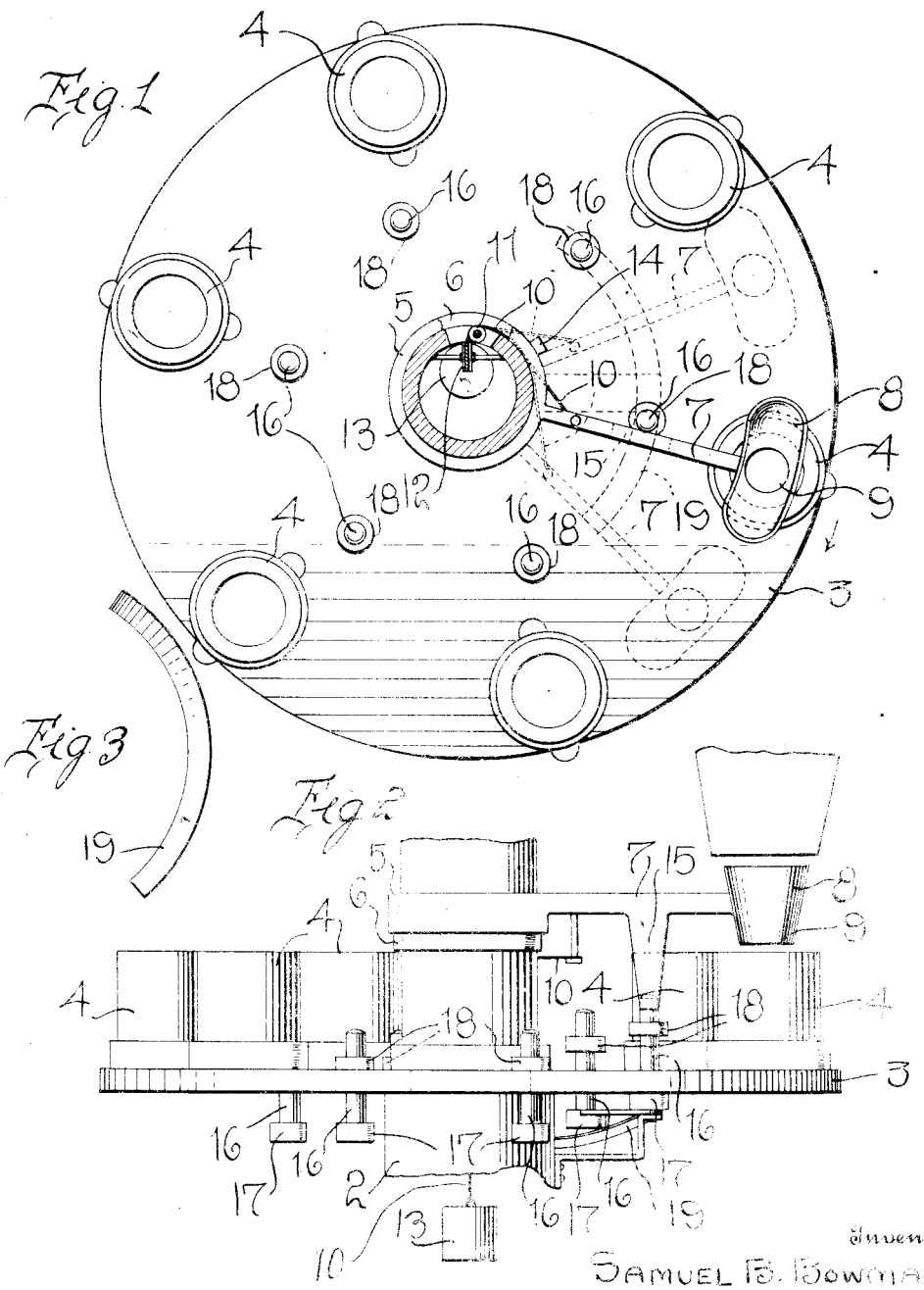
Samuel B. Bowman
By Watson E. Coleman
Attorney

UNITED STATES PATENT OFFICE.

SAMUEL BENJAMIN BOWMAN, OF BLACKWELL, OKLAHOMA, ASSIGNOR TO THE HAZEL ATLAS GLASS CO., OF WHEELING, WEST VIRGINIA, A CORPORATION OF WEST VIRGINIA.

MEANS FOR DISTRIBUTING MOLTEN GLASS.

1,191,868.

Specification of Letters Patent.  Patented July 18, 1916.

Application filed March 27, 1915. Serial No. 17,460.

*To all whom it may concern:*

Be it known that I, SAMUEL B. BOWMAN, a citizen of the United States, residing at Blackwell, in the county of Kay and State of Oklahoma, have invented certain new and useful Improvements in Means for Distributing Molten Glass, of which the following is a specification, reference being had to the accompanying drawings.

My invention relates to the art of glass-making, and particularly to means for distributing molten glass to molds or other desired receptacles.

The primary object of my invention is to provide means for delivering molten glass to either a blank mold, a finishing mold, or to any other desired receptacle for the glass while such mold or receptacle is in motion, thus providing means whereby the mold or molds or other receptacle may receive its charge of molten glass while mounted upon a continuously moving table and without coming to a standstill during the time that the molten glass is delivered thereto. This device is designed to be used to receive and aid in distributing molten glass received from any desired means and distributed to the molds in use at the present time, the glass being received by the distributing member, forming part of my invention, by either the hand gathered process, by a continuous flowing stream of glass, or by an intermittent delivery device.

A further object of my invention is the provision, in connection with a series of molds or receptacles continuously in a closed path, of a distributing vessel or hopper into which the molten glass is initially disposed, and which is so mounted that it will move successively with each mold for a predetermined period until its contents have been discharged into the mold or receptacle.

A further object of my invention is to provide, in mechanism of the above character, a very simple means for returning the distributing vessel to its initial position ready to receive a new charge of glass.

A further object of my invention is to provide, in connection with a series of molds continuously movable in a closed path, a movable distributer or hopper so shaped as to receive the molten glass at a moment most convenient and expedient for delivery and thereupon deliver the glass through its bottom into the desired receptacle or mold, this movable distributing vessel or hopper being so mounted that it will travel for a short way with the mold to which it is delivering and until such time as the molten glass may all be delivered into the mold or receptacle, and provide means whereby the distributer or hopper will then swing back to its original initial position over the next following receptacle or mold ready to be charged with molten glass and again perform its function.

Other objects will appear in the course of the following description.

My invention is illustrated in the accompanying drawings, wherein:

Figure 1 is a plan view of a mold table and molds with my invention applied thereto, the column being in section; Fig. 2 is a fragmentary side elevation of the mold table used with my invention; Fig. 3 is a plan view of the cam operating the clutching devices.

Referring to these drawings, 2 designates the central column of an ordinary mold-carrying table. Upon this central column is rotatably mounted the table 3, this table being of any ordinary construction, rotatable by means well known in the art, and carrying thereon a plurality of molds 4. It is to be understood, of course, that this table is continuously rotatable in one direction and is not intermittently movable, it being an object of my invention to provide a mechanism which will do away with any mechanism for intermittently moving the table. While I shall hereafter use the term "molds" to specifically distinguish the members 4, I wish it understood that the term "mold" is intended to include any receptacle for glass, and include either a blank mold or a finishing mold. To these molds 4, molten glass is to be delivered in turn while the table 3 is revolving around the column 2. Mounted upon the column 2, above the mold table for revolution around the column 2, is a collar 5, which collar is illustrated as resting upon a fixed collar 6. This collar 5 carries upon it the outwardly radially projecting arm 7, which carries at its end the hopper-shaped distributing receptacle 8. As illustrated in the figures, the receptacle 8 tapers toward its lower end or discharge mouth 9, the body of the receptacle being in the form of an ellipse or oval, the discharge opening being round. The receptacle 8 originally receives its glass from a container disposed above the receptacle at the rear end of its path of movement, this container having a discharge snout designated A. This discharge snout is the ordinary snout whereby molten glass is delivered from a melting pot or tank to the molds. The receptacle 8 is elongated in the direction of its path of movement in order that the time during which glass may pass from the snout A into the receptacle may be prolonged, thus permitting the receptacle to be completely filled while it is moving from a position, wherein the snout is disposed above the forward end of the receptacle to a position wherein the snout is disposed at the rear end of the receptacle. I do not wish to be limited to this particular form of supporting receptacle, however, nor to the particular proportions of the parts as illustrated. Neither do I wish to be limited to the particular manner of mounting the distributing receptacle 8 upon the column 2.

The table 3 is assumed to rotate in the direction of the arrow in Fig. 1, disposed adjacent the margin of the table, that is, the table is assumed to rotate in a clockwise direction. The arm 7 supporting the distributing receptacle 8 is mounted for movement in either direction, but is normally urged in a counter-clockwise direction by any suitable means. As illustrated, a cord or other flexible connection 10 is attached to the arm 7 and extends tangentially inward toward the column, passes through an opening in the column and over a pulley 11, then passes over a vertically disposed pulley 12 and is attached to a weight 13 freely movable vertically within the interior of the column. A stop 14 is mounted upon the column limiting the movement of the arm 7 in a counter clockwise direction, but permitting movement of the arm in the same direction as the table.

For the purpose of moving the arm 7 in the same direction as the table to carry the distributing receptacle 8 with one of the molds for a predetermined distance, I form the arm 7 with the downwardly extending arm or prolongation 15, and mount upon the table 3 in conjunction with each mold a vertically slidably clutch, which, as illustrated, has the form of a pin 16, the lower end of the pin being formed with a head 17 and the upper portion of the pin below its upper extremity being provided with the shoulder 18. These pins 16 are freely movable in openings formed in the table and therefore will drop by gravity to their lowest position with the heads 18 against the upper face of the table 3. The extension 15 of the arm 7 is disposed in the path of movement of these pins 16, and it will be obvious that if one of these pins be raised to its full extent the upper extremity of the pin will engage with the extension 15 and that then the arm 7 will travel with the pin until such time as the pin or clutch 16 be dropped out of its engagement with the extension 15. For the purpose of automatically raising these clutch members 16 so as to bring them successively into position to engage with the extension 15 and cause them to remain in engagement with the extension 16 until the arm 7 has traveled to the extent desired, I provide beneath a portion of the table 3 the arcuate track 19 which forms a cam track the entrance end of the track being downwardly inclined. When now a clutch member 16 arrives at one end of the track, the head 17 will be engaged by the track, the clutch member will be forced upward and its upper extremity will engage with the lower end of the extension 15 of the arm 7, thence forward the arm 7 will move with the table 3 and against the weight 13. When the end of the track 19 is reached and the end of the clutch member passes off the track, the clutch member will drop and release its engagement with the extension member 15 and the weight 13 will then act to move the arm 7 in a counter-clockwise direction until the arm is engaged by the stop 14, thus bringing the receptacle 8 back to its initial position.

The operation of my device will be obvious from the above. The table 3 as before stated is to rotate continuously and uninterruptedly in one direction. The initial position of the distributing receptacle 8 is such that it will receive the molten glass at a moment most convenient and expedient for delivery, and that then it will be engaged by the clutch member or pin 16 on the table and will be carried along with and over the mold with which the particular clutch member is associated, and will travel with this mold until such time as the glass in the distributing receptacle is entirely delivered into the mold. At this point the track 19 ends and the clutch member will drop downward, permitting the return of the distributing receptacle to its initial position ready to be charged with molten glass and perform again a function described.

While I have not so illustrated the receptacle 8, it is to be understood that this may be cooled in any suitable or usual manner rendered necessary for the proper operation of the mechanism, as for instance, by blowing air upon the receptacle or by forming the receptacle with double walls and causing a flow of cooling water between the walls in the manner ordinary in cooling glass working devices.

While I have illustrated certain specific details of construction and a certain specific mode of operation, I wish it understood that I do not wish to confine myself to the particular mechanism which has been heretofore described, this mechanism being only shown and described for the purpose of illustrating the principle of my device. Thus I do not wish to limit myself to the particular means shown for causing the movement of the transferring or distributing receptacle 8, nor to the shape and size of said receptacle, nor to having the receptacle 8 travel bodily and as a whole with the mold into which it is discharged. All of these details may be varied in many different ways without departing from the spirit of my invention, though I have illustrated a very simple and entirely effective plan for use with molds mounted upon a rotatable table.

Having thus described my invention, what I claim is:

1. In a glass forming machine a series of molds movable continuously in a constant direction, and a transfer receptacle movable from a filling position with each mold for a predetermined portion of the travel of the mold and during this period discharging thereinto whereby the discharge period of the transfer receptacle shall be prolonged, said transfer receptacle being elongated in the direction of its movement whereby it may be filled while it is moving and thus the filling period of the transfer receptacle prolonged.

2. In a glass forming machine, a series of molds movable continuously in one direction, a transfer receptacle at all times movable in alinement with the path of travel of the molds and movable from a filling position with each mold for a predetermined portion of the movement of the latter and discharging thereinto during this period whereby the discharge period of the transfer receptacle shall be prolonged, said transfer receptacle being elongated in the direction of its movement whereby it may be filled while it is moving and thus the filling period of the transfer receptacle be prolonged.

3. In a glass forming machine, a series of molds movable continuously in one constant direction and a transfer receptacle movable from a filling position with each mold for a predetermined portion of the travel of the mold and during this period discharging thereinto whereby the discharge period of the transfer receptacle shall be prolonged, said transfer receptacle at all times moving in alinement with the path of travel of the mold, the transfer receptacle being elongated in the direction of its movement whereby it may be filled when it is moving and thereby the filling period of the transfer receptacle be prolonged, and means for returning the transfer receptacle to its initial filling position at the end of such predetermined period of travel with the mold.

4. In a glass machine, a plurality of receiving receptacles continuously movable in a closed path, and means for discharging molten glass into said receptacles in successive order, said means moving with each receptacle during a predetermined portion of its movement and then returning to an initial position and coacting with the next following receptacle.

5. In a glass machine, a plurality of receiving receptacles movable uninterruptedly and continuously in a closed path, and means for distributing glass into each of these receptacles successively, said means including a member movable from an initial glass receiving position with each of said receiving receptacles successively and for a predetermined extent of movement of the latter and after said coincident movement returning to an initial position and coacting with the next successive receiving receptacle.

6. In a glass machine, a plurality of receptacles movable continuously in a closed path, a transferring or distributing receptacle successively engaged operatively with each of said receiving receptacles for coincident movement therewith and while so engaged discharging thereinto, and means for disengaging said distributing receptacle from its engagement with said receiving receptacle and returning it to its initial position after the contents of the distributing receptacle have been discharged into the receiving receptacle.

7. In a glass machine, a rotatable table, a plurality of receiving receptacles mounted thereon, a transferring or distributing receptacle mounted for movement in an arc concentric with the axis of movement of the table and in alinement with said receiving receptacle, means yieldingly holding the transferring or distributing receptacle at an initial glass-receiving position, means for causing an operative engagement between said table and the distributing receptacle when a receiving table is disposed beneath the outlet end of the transferring receptacle, said means acting to cause a coincident movement of the distributing receptacle with the receiving receptacle against the action of said holding means, and means for causing a disengagement of said distributing receptacle with the table after the distributing receptacle has traveled a predetermined distance to thereby permit the holding means to return the distributing receptacle to its initial position.

8. In a glass machine, a supporting column, a table rotatable thereon, a plurality of molds mounted upon the table, an arm operatively supported upon the column for movement therearound, a transferring or distributing receptacle mounted upon said arm and adapted to coact with said molds, means yieldingly holding the arm in an initial position, means for causing an operative engagement between the arm and said table when a mold has arrived beneath the distributing receptacle to thereby cause the distributing receptacle to fall with the mold, and means for causing a disengagement between the table and said arm after the distributing receptacle has traveled with the mold for a predetermined distance to thus permit the return of said arm to its initial position.

9. In a glass machine, a central column, a table rotatably mounted thereon, a plurality of molds carried by said table, an arm rotatively mounted upon the column and a transferring or distributing receptacle mounted upon said arm and adapted to coact with said molds, means yieldingly urging the arm to an initial position, and means for causing the coincident movement of the arm with the table including a vertically movable element mounted upon the table in conjunction with each mold, said element when raised being disposed in the path of movement of the arm, and a fixed cam mounted below the table and causing the elevation of the element into operative engagement with the arm, said cam being disposed concentric to the column.

10. In a glass machine, a central column, a table rotatably mounted thereon, a plurality of molds mounted upon the table, an arm rotatably mounted upon the column and carrying a distributing or transferring receptacle at its extremity, a stop carried by the column with which said arm engages, yielding means for yieldingly holding the arm against the stop, and means for causing the coincident movement of the arm with the table when a mold is disposed beneath the distributing receptacle, said means including a plurality of vertically movable members mounted upon the table each in connection with one of the molds, said members being normally depressed out of position to engage said arm, and means for successively raising each of said members into operative engagement with the arm when the mold coacting therewith is beneath the distributing receptacle and holding said member raised during the predetermined extent of travel of the table.

11. In a glass machine, a column, a table rotatably mounted thereon, a plurality of molds mounted upon the table, an arm rotatably mounted upon the column, a transferring or distributing receptacle mounted upon the end of the arm and coacting with said molds, a weight urging the arm in one position, a stop with which said arm engages under the action of the urging means, and means for causing a coincident movement of the arm with the table when a mold lies beneath the distributing receptacle, said means including a plurality of vertically movable pins mounted upon the table, one in conjunction with each mold, said pins being normally depressed, and a cam disposed concentric to the axis of rotation of the table and beneath the same and engaging successively with the pins to lift them into engagement with the arm and hold them in said engagement during a predetermined portion of the movement of the table.

12. In a glass machine, a column, a table rotatably mounted thereon, a plurality of molds carried upon the table, an arm rotatably mounted upon the column above the table, a transferring or distributing receptacle carried by said arm, said arm having a downward extension, a weight disposed within the column, a flexible connection operatively connecting the weight of said arm to draw the arm in a direction reverse to the movement of the table, a stop for limiting said movement of the arm, and means for causing a movement of the arm in the direction of and coincident with the table when a mold is disposed beneath a distributing receptacle, said means including a plurality of vertically movable pins operatively mounted on the table one in conjunction with each mold, and a cam disposed concentric to the column and having a cam surface adapted to engage successively with said pins to thereby raise them into operative engagement with the downward extension of the arm and hold them in such engagement during the movement of the table to a predetermined angular distance.

In testimony whereof I hereunto affix my signature in the presence of two witnesses.

SAMUEL BENJAMIN BOWMAN.

Witnesses:
JOHN W. CARNAHAN,
GEO. C. CRAWFORD.

DISCLAIMER.

1,191,868.—*Samuel Benjamin Bowman*, Blackwell, Okla. MEANS FOR DISTRIBUTING MOLTEN GLASS. Patent dated July 18, 1916. Disclaimer filed October 23, 1916, by the assignee, *Hazel-Atlas Glass Company*.

Enters this disclaimer—

"To the subject-matter of claims 4 and 5 in said specification, which are in the following words, to wit:

"4. In a glass machine, a plurality of receiving receptacles continuously movable in a closed path, and means for discharging molten glass into said receptacles in successive order, said means moving with each receptacle during a predetermined portion of its movement and then returning to an initial position and coacting with the next following receptacle.

"5. In a glass machine, a plurality of receiving receptacles movable uninterruptedly and continuously in a closed path, and means for distributing glass into each of these receptacles successively, said means including a member movable from an initial glass receiving position with each of said receiving receptacles successively and for a predetermined extent of movement of the latter and after said coincident movement returning to an initial position and coacting with the next successive receiving receptacle."

[*Official Gazette, October 31, 1916.*]